United States Patent
Koganei et al.

(10) Patent No.: US 7,603,369 B2
(45) Date of Patent: Oct. 13, 2009

(54) TERMINAL AUTHENTICATION APPARATUS AND METHOD

(75) Inventors: Tomohiro Koganei, Osaka (JP); Teruo Koukai, Nara (JP)

(73) Assignee: Panasonic Corporation, Osaka (JP)

( * ) Notice: Subject to any disclaimer, the term of this patent is extended or adjusted under 35 U.S.C. 154(b) by 643 days.

(21) Appl. No.: 10/572,168

(22) PCT Filed: Oct. 20, 2004

(86) PCT No.: PCT/JP2004/015862

§ 371 (c)(1),
(2), (4) Date: Mar. 16, 2006

(87) PCT Pub. No.: WO2005/038661

PCT Pub. Date: Apr. 28, 2005

(65) Prior Publication Data

US 2006/0184533 A1   Aug. 17, 2006

(30) Foreign Application Priority Data

Oct. 22, 2003   (JP) .............................. 2003-361689

(51) Int. Cl.
*G06F 17/30* (2006.01)
(52) U.S. Cl. ........................................ 707/101; 707/10
(58) Field of Classification Search .................... 707/10, 707/101
See application file for complete search history.

(56) References Cited

U.S. PATENT DOCUMENTS

2003/0147369 A1 * 8/2003 Singh et al. ................. 370/338
2005/0160289 A1 * 7/2005 Shay ........................... 713/201

FOREIGN PATENT DOCUMENTS

| JP | 06-203032 A | 7/1994 |
| JP | 2002-269052 | 9/2002 |
| JP | 2003-244124 A | 8/2003 |
| WO | WO 01/71515 A1 | 9/2001 |

OTHER PUBLICATIONS

Lara et al., "Collaboration and multimedia authoring on mobile devices", Proceedings of the 1st international conference on Mobile systems, May 2003, p. 286-301. Retrieved from the Internet: <URL: ttp://portal.acm.org/ft_gateway.cfm?id=1066126&type=pdf&coll=ACM&dl=ACM&CFID=45334632&CFTOKEN=27900957>.*

Jing et al., "Client-server computing in mobile environments", ACM Computing Surveys, vol. 31, No. 2, Jun. 1999, p. 117-157. Retrieved from the Internet:<URL: ttp://portal.acm.org/ft_gateway.cfm?id=319814&type=pdf&coll=ACM&dl=ACM&CFID=45334632&CFTOKEN=27900957>.*

International Search Report for PCT/JP2004/015862, dated Feb. 8, 2005.

* cited by examiner (Continued)

Primary Examiner—Jean B. Fleurantin
Assistant Examiner—Dennis Myint
(74) Attorney, Agent, or Firm—RatnerPrestia

(57) ABSTRACT

In a client/server system that authenticates according to a terminal ID, a terminal authentication apparatus is provided that is capable of authenticating a terminal device correctly even if the method of generating a terminal ID has been changed from the old version to a new one, and thus useful as an authentication apparatus for a net TV, mobile phone, on-line network for ATMs, and the like. The apparatus transmits two terminal IDs generated with the generation methods in both old and new versions. With this method, the server authenticates from these two terminal IDs according to the ID fields of the old and new versions, and additionally updates the ID in the old version to a new one.

11 Claims, 3 Drawing Sheets

TERMINAL AUTHENTICATION APPARATUS AND METHOD

This application is a U.S. National Phase Application of PCT International Application PCT/JP2004/015862.

TECHNICAL FIELD

The present invention relates to authentication according to the terminal ID of a device in a client/server system that performs terminal authentication on a communication network.

BACKGROUND ART

Conventionally, in a client/server system that performs authentication on a communication network, user identification has been widely used by means of BASIC authentication, which transmits authentication information such as a user name, and password; and DIGEST authentication, which transmits the authentication information having been encrypted. The technology described in Japanese Patent Unexamined Publication No. 2002-269052 implements more strict authentication by means of the combination of a mobile phone number, the terminal-specific ID number, and the user's fingerprint. Meanwhile, Web-enabled TV (referred to as "net TV" hereinafter) performs authentication by transmitting a unique terminal ID according to a device-specific value, to a server. The software in a television receiver for digital broadcasting can be upgraded by being rewritten using on-air downloading. The software in a net TV with digital broadcasting reception can be upgraded by downloading as well.

DISCLOSURE OF THE INVENTION

The terminal authentication apparatus includes:
a client apparatus having:
  a terminal ID generator for generating a unique terminal ID from a device-specific value;
  terminal ID storage for storing the terminal ID generated by the terminal ID generator;
  a header information synthesizer for synthesizing the terminal ID stored in the terminal ID storage;
  a client data transmitter for transmitting client data to a server;
  a server data receiver for receiving the data transmitted from the server; and
  a display processor for displaying the data received; and
a server having:
  a client data receiver for receiving the data transmitted from a client;
  a terminal ID extractor for extracting a terminal ID from the data received by the client data receiver;
  a terminal ID comparator for comparing the ID extracted by the terminal ID extractor with information registered;
  a data reader for reading data from a database;
  a data writer for writing data to the database;
  a terminal authenticator for authenticating the terminal by the ID compared by the terminal ID comparator; and
  a server data transmitter for transmitting server data to the client.

The method of authenticating a terminal includes:
a terminal ID generating step for generating a unique terminal ID from a device-specific value;
a terminal ID storing step for storing the terminal ID generated in the terminal ID generating step;
a header information synthesizing step for synthesizing the terminal ID stored in the terminal ID storing step;
a client data transmitting step for transmitting client data to a server;
a server data receiving step for receiving the data transmitted from the server;
a display processing step for displaying the data received;
a client data receiving step for receiving the data transmitted from a client;
a terminal ID extracting step for extracting a terminal ID from the data received in the client data receiving step;
a terminal ID comparing step for comparing the ID extracted in the terminal ID extracting step, with information registered;
a data reading step for reading data from a database;
a data writer for writing data to the database;
a terminal authenticating step for authenticating the terminal by the ID compared in the terminal ID comparing step; and
a server data transmitting step for transmitting server data to the client.

DETAILED DESCRIPTION OF THE PREFERRED EMBODIMENTS

In the above-mentioned conventional methods, upgrading the software may immediately cause an authentication failure for the terminal that has been authenticated in the old version, in a case where the method of generating an ID has been changed from the old version of the software to new one. When IPv6 will be practically used in the future, information registered for authentication in IPv4 may require to be registered again. The present invention aims to provide a method for authenticating a terminal device correctly even if the method of generating an ID has been changed from the old version of the software to new one.

A description is made for the present invention with an exemplary embodiment hereinafter.

Figure 1:
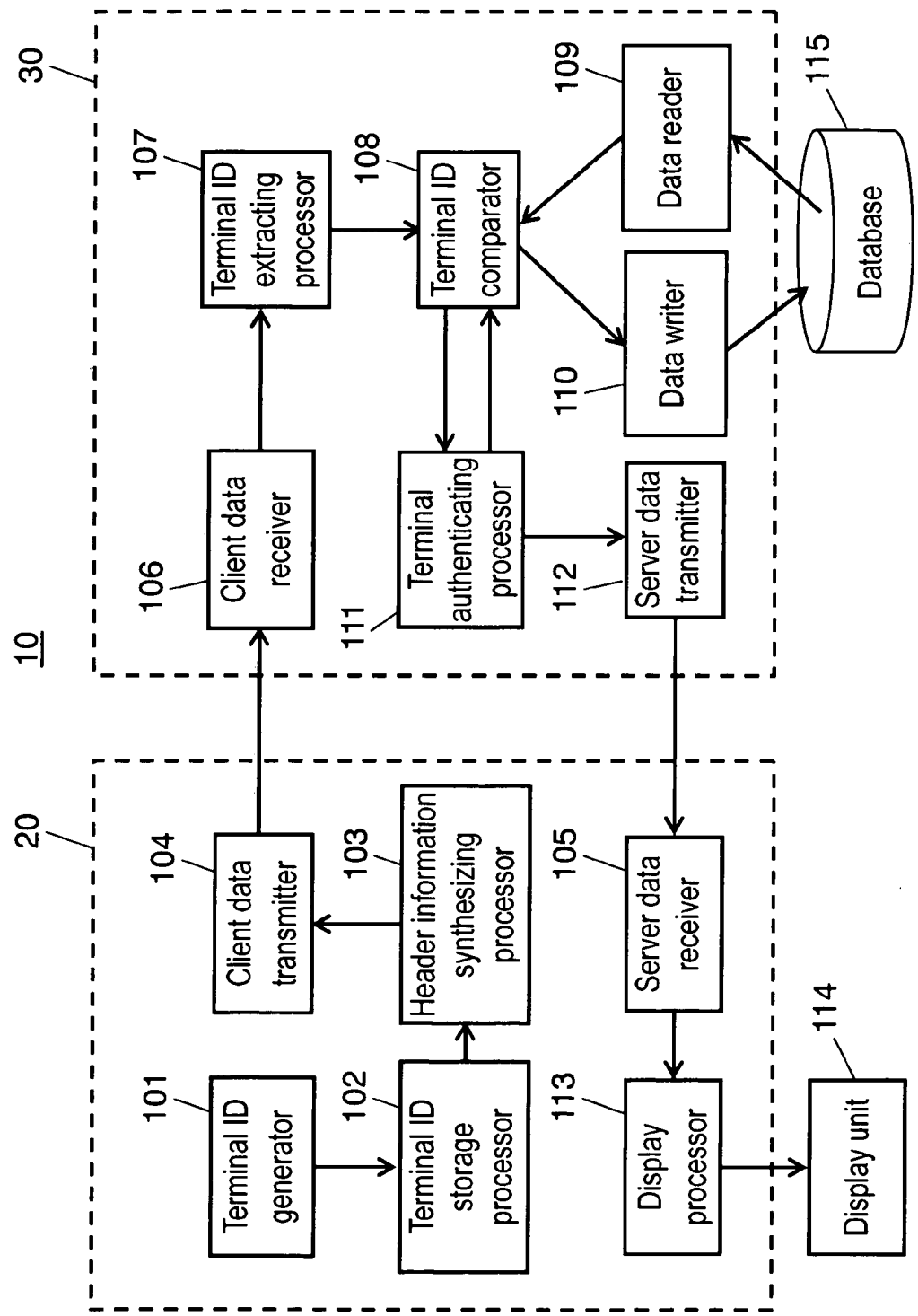
FIG. 1 is a block diagram illustrating the makeup of a terminal authentication apparatus according to an exemplary embodiment of the present invention.

FIG. 1 is a block diagram illustrating the makeup of a terminal authentication apparatus according to an exemplary embodiment of the present invention.

In FIG. 1, terminal authentication apparatus 10 consists of client apparatus 20 and server 30. Client apparatus 20 is composed of terminal ID generator 101, terminal ID storage processor 102, header information synthesizing processor 103, client data transmitter 104, server data receiver 105, and display processor 113. Server 30 is composed of client data receiver 106, terminal ID extractor 107, terminal ID comparator 108, data reader 109, data writer 110, terminal authenticating processor 111, and server data transmitter 112.

Terminal ID generator 101 generates a unique terminal ID from a device-specific value to supply it to terminal ID storage processor 102. Terminal ID storage processor 102 temporarily stores the terminal ID received. Header information synthesizing processor 103 receives the terminal ID stored in terminal ID storage processor 102 as required, and processes the terminal ID and other pieces of information in a given manner to synthesize header information. This header information may be HTTP header information, for example. Client data transmitter 104 receives the header information synthesized by header information synthesizing processor 103, and transmits it along with other information. The signal to be transmitted is usually of a given packet structure, which is a data string compliant with a given syntax. The packet is composed of a header, payload, error control information, for example. This data string may undergo a given modulation.

In this way, the information transmitted from client data transmitter 104 of client apparatus 20 is received by client data receiver 106 of server 30. Receiver 106 executes processes principally the reverse of those executed by transmitter 104. That is, receiver 106 restores the header information generated by header information synthesizing processor 103, to its original state, on the basis of the information received, and supplies it to terminal ID extractor 107. Extractor 107 executes processes principally the reverse of those executed by processor 103. That is, extractor 107 restores the terminal ID supplied from terminal ID storage processor 102, to its original state, on the basis of the header information received, and supplies it to terminal ID comparator 108.

Figure 2:
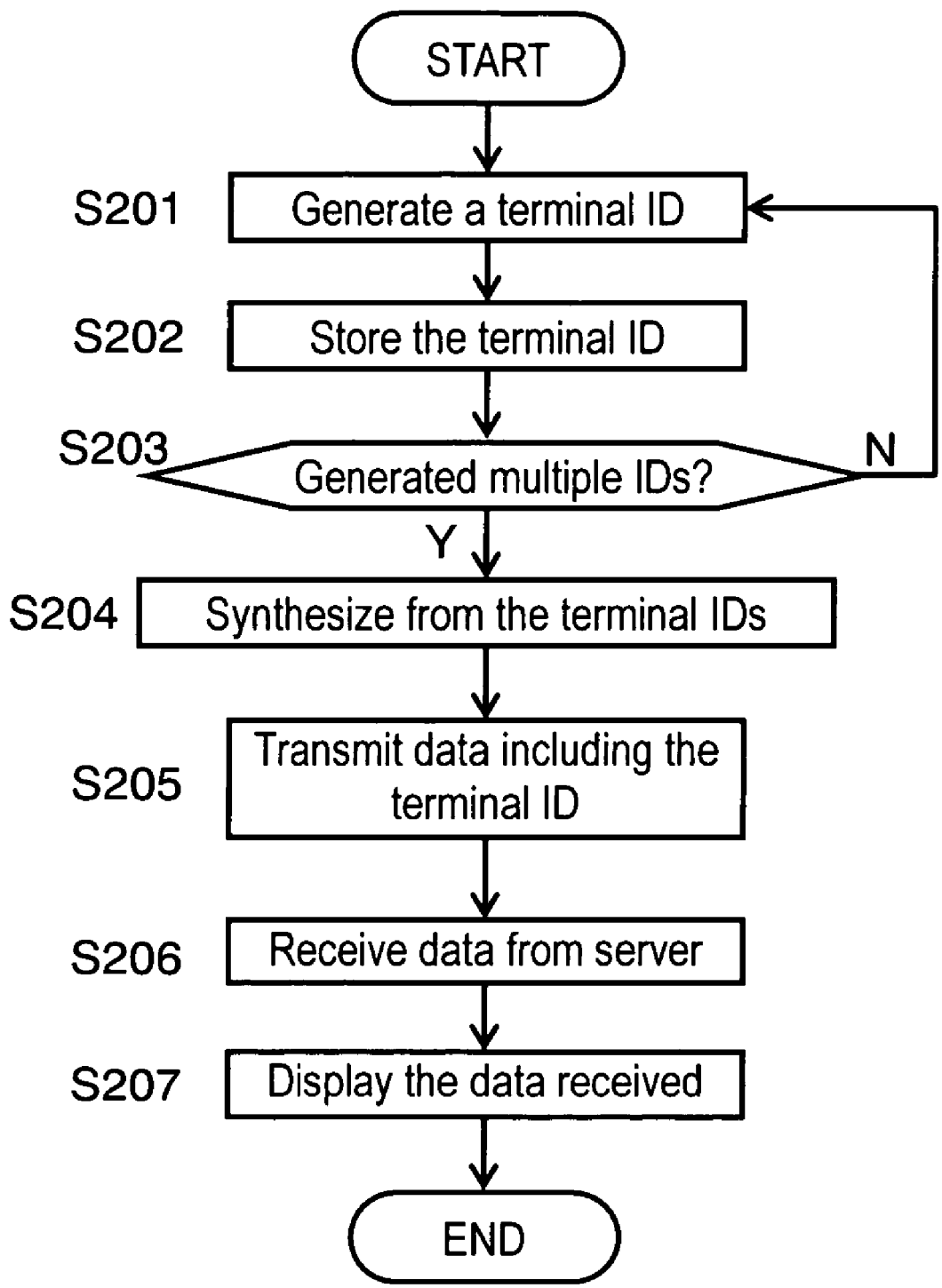
FIG. 2 is a flowchart illustrating the processes at a client according to the exemplary embodiment of the present invention.
Figure 3:
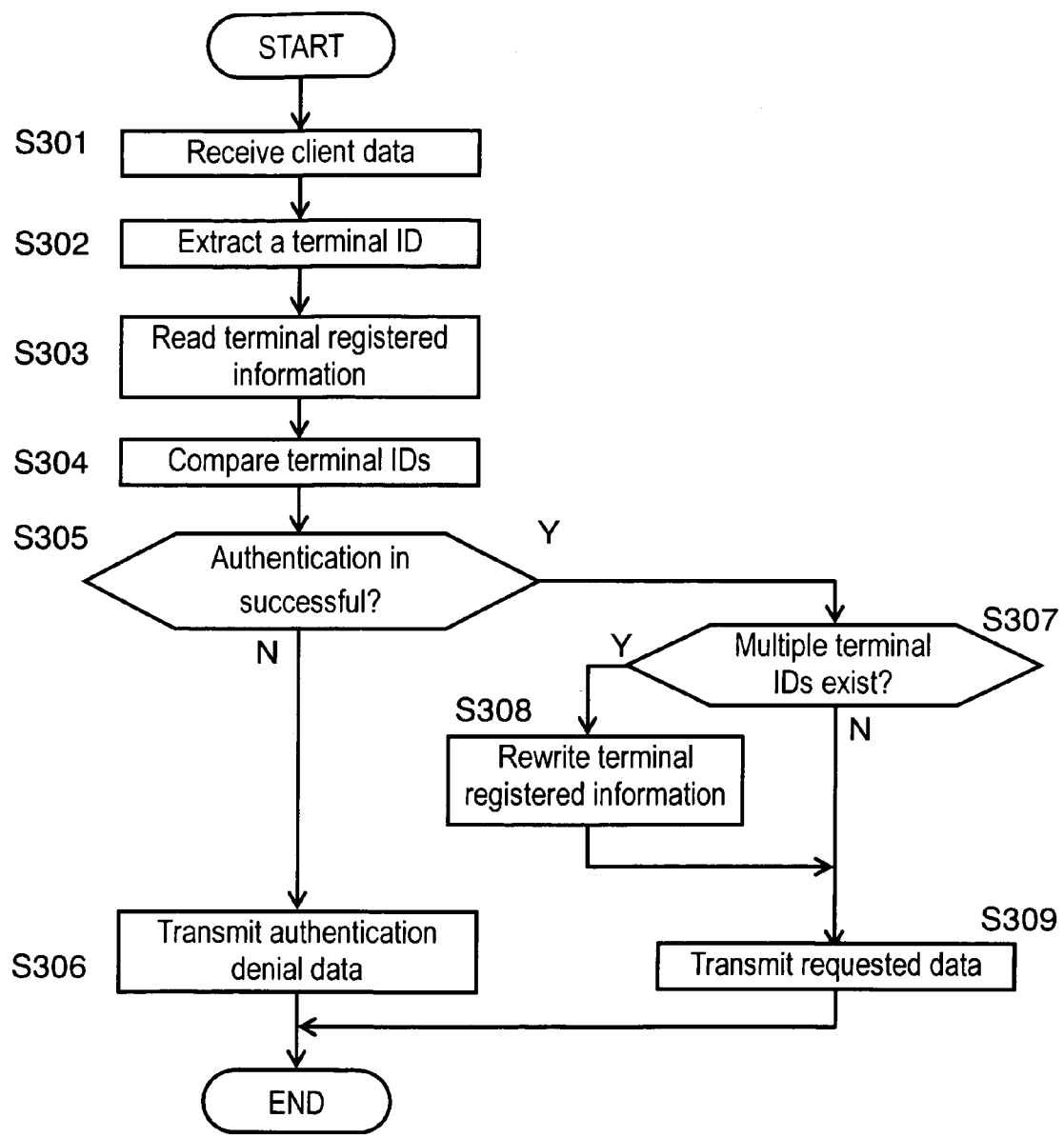
FIG. 3 is a flowchart illustrating the processes at a server according to the exemplary embodiment of the present invention.

Next, a description is made for the processes of generating and rewriting a terminal authentication ID, and the authentication process, in the terminal authentication apparatus according to the present invention, using the flowcharts in FIGS. 2 and 3, where a further description for FIG. 1 is made.

Hereinafter, a description is made for the operating processes of terminal apparatus 20 in the terminal authentication apparatus, namely at the client side, using FIG. 2. In step S201, a terminal ID is generated. This process corresponds to that in terminal ID generator 101 in FIG. 1. Then the flow moves to step S202. In step S202, the terminal ID generated is stored in a terminal ID storage buffer. Then the flow moves to step S203. In step S203, judgement is made whether multiple terminal IDs have been generated. The flow returns to step S201 if multiple terminal IDs have not been generated, and move to step S204 otherwise. In step S204, header information is synthesized from multiple terminal IDs generated, header information such as HTTP header information. This process corresponds to that in header information synthesizer 103 in FIG. 1. Then the flow moves to step S205. In step S205, HTTP request information including the terminal ID is transmitted to server 30. Then the flow moves to step S206 after receiving a response from server 30. In step S206, the data transmitted from server 30 is received. Then the flow moves to step S207. In step S207, the data received is displayed by display unit 114, to complete the process.

Meanwhile, in this exemplary embodiment, client apparatus 20 generates multiple terminal IDs as mentioned above. The reason is described hereinafter. The new version of software generates multiple terminal IDs with the methods of generating terminal IDs in both new and old versions, always resulting in generating a terminal ID in the old version as well. That is, the terminal ID generated with the terminal ID generation method in the new version is not transmitted alone, but that with the old one is transmitted as well. As a result of such operation, the server correctly authenticates a terminal device on the basis of terminal ID information generated with both old and new versions of the software, even if the terminal ID generating method has been changed from the old version of the software to new one. Further details about this operation is mentioned in the description for FIG. 3.

Next, a description is made for the operating processes of server 30 in the terminal authentication apparatus, namely at the authentication side, using FIG. 3. In step S301, client data transmitted from a client is received. That is, server 30 receives client data from client data transmitter 104 of client apparatus 20. Then the flow moves to step S302. In step S302, a terminal ID is extracted from the field for a terminal ID included in the data received, and the flow moves to step S303. Step 302 corresponds to the operation in terminal ID extracting processor 107. In step S303, terminal information registered in the database is read. That is, data reader 109 reads terminal information registered in database 115. Then the flow moves to step S304. In step S304, the terminal ID extracted in step S302 is compared with the terminal information read in step S303. That is, terminal ID comparator 108 compares the terminal information read by data reader 109, with the terminal ID extracted by terminal ID extracting processor 107. At this moment, even if the value of the terminal ID field in the new version is not registered in the database, if that in the old one exists, that is to say, multiple terminal ID fields exist, judgement is made whether the respective ID values are registered in the database, and then the judgement result is transmitted in step S305.

In step S305, authentication is executed on the basis of the comparison result in step S304. Step 305 corresponds to the operation in terminal authenticating processor 111. If the authentication results in failure, that is, if determined as authentication denial, the flow moves to step S306; in success, to step S307. In step S306, data indicating authentication denial is transmitted to the client, and the process ends. Step 306 corresponds to the operation in server data transmitter 112. Meanwhile in step S307, judgement is made whether or not multiple terminal IDs exist. If multiple, the flow moves to S308; single, to S309. In step S308, the old terminal information is rewritten with the new one. In other words, for multiple terminal IDs, if the terminal ID registered agrees with any of the values of the terminal ID fields in the old version, the value of the terminal ID field in the new one is registered in the server as a new terminal ID.

Step S308 is executed by data writer 110 and database 115. Then the flow moves to step S309. In step S309, requested data is transmitted to the client. That is, data server transmitter 112 transmits corresponding desired data, and then the process ends.

Client apparatus 20 transmits two terminal IDs generated with the generation methods in both old and new versions, as mentioned in the description for FIG. 2. In step 308, server 30 authenticates from these two terminal IDs according to the ID fields of the old and new versions, and additionally updates the terminal ID in the old version to a new one.

Incidentally, in step S306, if data indicating authentication denial is transmitted to the client side, the data is received in step S206 in FIG. 2. That is, server data receiver 105 of client apparatus 20 receives data indicating authentication denial. At this moment, client apparatus 20 cannot receive the data that client apparatus 20 has requested.

Meanwhile in step S309, when requested data is transmitted to the client, desired requested data is received in step S206 in FIG. 2. That is, client apparatus 20 can receive the data requested by client apparatus 20.

In this way, if authentication is established, data server transmitter 112 transmits corresponding desired data according to a request from client apparatus 20. Server data receiver 105 of client apparatus 20 receives desired data transmitted from data server transmitter 112.

As mentioned in the above description, the authentication terminal apparatus according to the present invention is provided with a client apparatus and a server. The client apparatus of the present invention is equipped with a terminal ID generator for generating a unique ID from a value specific to a device at the client apparatus; terminal ID storage for storing the terminal ID generated by the terminal ID generator; a header information synthesizer for synthesizing the terminal ID stored in the terminal ID storage; a client data transmitter for transmitting the client data to the server; a server data receiver for receiving data transmitted from the server; and a display processor for displaying data received. Meanwhile, the server of the present invention is equipped with a client data receiver for receiving data transmitted from the client; a terminal ID extractor for extracting a terminal ID from data received from the client data receiver; a terminal ID comparator for comparing an ID extracted by the terminal ID extractor, with information registered; a data reader for reading data from the database; a data writer for writing data to the database; a terminal authenticator for authenticating a terminal according to an ID compared by the terminal ID comparator; and a server data transmitter for transmitting server data to the client.

In the terminal authentication apparatus of the present invention, the above-mentioned terminal ID generator is one that generates a unique ID from a device-specific value, capable of generating respective unique IDs from multiple device-specific values.

The terminal ID comparator of the present invention is one that compares an ID extracted by the terminal ID extractor, with information registered. For multiple terminal IDs extracted, if the terminal ID registered agrees with one of the terminal IDs, the other ID can be registered as a new one as well.

Here, a unique ID is an attribute value of a unique and inherent symbol string or number, identifying multiple devices respectively.

With the above-mentioned makeup and operation, the terminal authentication apparatus and its method according to the present invention is capable of authenticating a terminal device correctly even if the method of generating an ID has been changed from the old version of the software to new one.

INDUSTRIAL APPLICABILITY

The terminal authentication apparatus of the present invention is capable of authenticating a terminal device correctly even if the method of generating an ID has been changed from the old version to a new one, which is useful as an authentication apparatus for a net TV, mobile phone, on-line network for ATMs, and the like.

Reference Numerals in the Drawings

10 Terminal authentication apparatus
20 Client apparatus
30 Server
101 Terminal ID generator
102 Terminal ID storage processor
103 Header information synthesizing processor
104 Client data transmitter
105 Server data receiver
106 Client data receiver
107 Terminal ID extracting processor
108 Terminal ID comparator
109 Data reader
110 Data writer
111 Terminal authenticating processor
112 Server data transmitter
113 Display processor
114 Display unit
115 Database

The invention claimed is:

1. An apparatus for authenticating a terminal comprising:
 a client apparatus having:
  a terminal ID generator for generating a unique terminal ID from a device-specific value of the terminal;
  terminal ID storage for storing the terminal ID generated by the terminal ID generator;
  a header information synthesizer for synthesizing the terminal ID stored in the terminal ID storage;
  a client data transmitter for transmitting client data to a server;
  a server data receiver for receiving a server data transmitted from the server, as received server data;
  a display processor for displaying the received server data; and
 the server having:
  a client data receiver for receiving the client data transmitted from the client, as received client data;
  a terminal ID extractor for extracting the terminal ID from the received client data by the client data receiver;
  a terminal ID comparator for comparing the ID extracted by the terminal ID extractor with information registered;
  a data reader for reading data from a database;
  a data writer for writing data to the database;
  a terminal authenticator for authenticating the terminal associated with the terminal ID compared by the terminal ID comparator; and
  a server data transmitter for transmitting the server data to the client,
 wherein the terminal ID generator generates a first terminal ID using an old version of software and a second terminal ID using a new version of the software, and
 wherein the header information synthesizer synthesizes the header including the first and second terminal IDs in the same header.

2. The terminal authentication apparatus as claimed in claim 1, wherein the terminal ID generator is a terminal ID generator that generates a unique ID from a device-specific value, and generates respective unique IDs from multiple device-specific values.

3. The terminal authentication apparatus as claimed in claim 2,
 wherein the terminal ID comparator compares each terminal ID extracted by the terminal ID extractor with information registered, and
 in a case where the multiple terminal IDs are extracted, if one of the extracted terminal IDs agrees with one of the registered terminal IDs by comparing the extracted terminal IDs with the registered terminal IDs, another terminal ID is registered as a new terminal ID.

4. The terminal authentication apparatus as claimed in claim 1,
 wherein the terminal ID comparator compares each terminal ID extracted by the terminal ID extractor with information registered, and
 in a case where the multiple terminal IDs are extracted, if one of the extracted terminal IDs agrees with one of the registered terminal IDs by comparing the extracted terminal IDs with the registered terminal IDs, another terminal ID is registered as a new terminal ID.

5. A method of authenticating a terminal, comprising:
a client apparatus having:
- a terminal ID generating step for generating a unique terminal ID from a device-specific value of a terminal;
- a terminal ID storing step for storing the terminal ID generated in the terminal ID generating step;
- a header information synthesizing step for synthesizing the terminal ID stored in the terminal ID storing step;
- a client data transmitting step for transmitting client data to a server;
- a server data receiving step for receiving a server data transmitted from the server as received server data; and
- a display processing step for displaying the received server data; and the server having:
- a client data receiving step for receiving the client data transmitted from a client as received client data;
- a terminal ID extracting step for extracting the terminal ID from the received client data in the client data receiving step;
- a terminal ID comparing step for comparing the terminal ID extracted in the terminal ID extracting step with information registered;
- a data reading step for reading data from a database;
- a data writer step for writing data to the database;
- a terminal authenticating step for authenticating the terminal associated with the terminal ID compared in the terminal ID comparing step; and
- a server data transmitting step for transmitting the server data to the client, wherein the terminal ID generating step generates a first terminal ID using an old version of software and a second terminal ID using a new version of the software, and
wherein the header information synthesizing step synthesizes the header including the first and second IDs in the same header.

6. The method of authenticating the terminal as claimed in claim 5, wherein the terminal ID generating step is a terminal ID generating step that generates a unique ID from a device-specific value, and generates respective unique IDs from multiple device-specific values.

7. The method of authenticating each terminal as claimed in claim 6,
wherein the terminal ID comparing step compares each terminal ID extracted in the terminal ID extracting step with information registered, and
in a case where the multiple terminal IDs are extracted, if one of the extracted terminal ID agrees with one of the registered terminal IDs by comparing the extracted terminal IDs with the registered terminal IDs, another terminal ID is registered as a new terminal ID.

8. The method of authenticating the terminal as claimed in claim 5,
wherein the terminal ID comparing step compares each terminal ID extracted in the terminal ID extracting step with information registered, and
in a case where the multiple terminal IDs are extracted, if one of the extracted terminal ID agrees with one of the registered terminal IDs by comparing the extracted terminal IDs with the registered terminal IDs, another terminal ID is registered as a new terminal ID.

9. A computer-readable storage medium storing a program for execution by a computer to implement the method of authenticating the terminal as claimed in claim 5.

10. A computer-readable storage medium storing a program for execution by a computer to implement the method of authenticating the terminal as claimed in claim 6.

11. A computer-readable storage medium storing a program for execution by a computer to implement the method of authenticating the terminal as claimed in claim 8.

* * * * *